United States Patent
Lin et al.

(10) Patent No.: US 10,427,879 B2
(45) Date of Patent: Oct. 1, 2019

(54) CONVEYOR STRUCTURE

(71) Applicant: Jia-Tian Lin, Changhua (TW)

(72) Inventors: Jia-Tian Lin, Changhua (TW); Cheng-Tsung Su, Changhua County (TW)

(73) Assignee: Jia-Tian Lin, Changhua (TW)

( * ) Notice: Subject to any disclaimer, the term of this patent is extended or adjusted under 35 U.S.C. 154(b) by 0 days.

(21) Appl. No.: 16/101,082

(22) Filed: Aug. 10, 2018

(65) Prior Publication Data

US 2019/0047791 A1 Feb. 14, 2019

Related U.S. Application Data (60) Provisional application No. 62/543,660, filed on Aug. 10, 2017.

(51) Int. Cl.
| | |
|---|---|
| *B65G 15/34* | (2006.01) |
| *B65G 15/00* | (2006.01) |
| *B65G 15/30* | (2006.01) |
| *B65G 15/36* | (2006.01) |
| *D03D 13/00* | (2006.01) |

(52) U.S. Cl.
CPC ............. *B65G 15/36* (2013.01); *B65G 15/34* (2013.01); *D03D 13/002* (2013.01)

(58) Field of Classification Search
None
See application file for complete search history.

(56) References Cited

U.S. PATENT DOCUMENTS

| | | | | |
|---|---|---|---|---|
| 2,909,271 | A * | 10/1959 | Taylor ................. | B65G 15/42 198/690.2 |
| 4,106,613 | A * | 8/1978 | Thomson ............. | B65G 15/34 139/415 |
| 4,224,370 | A * | 9/1980 | Heinemann .......... | B41N 10/04 428/364 |
| 8,476,372 | B2 * | 7/2013 | Shimada ............. | B60C 9/0042 152/450 |

* cited by examiner

*Primary Examiner* — Kavel Singh
(74) *Attorney, Agent, or Firm* — Muncy, Geissler, Olds & Lowe, P.C.

(57) ABSTRACT

A conveyor structure includes a first conveyor structure layer, a core structure layer, and a second conveyor structure layer. The core structure layer is provided on the first conveyor belt structure and includes a rope layer, a plurality of first wefts, a plurality of second wefts and a cloth layer. The rope layer may be provided on the first conveyor structure layer and includes a plurality of warp ropes. The cloth layer may be disposed above the rope layer. The plurality of second wefts and the plurality of first wefts may be obliquely intertwined with each other and wrapped on the rope layer, or on the cloth layer, or on the rope layer and the cloth layer. The second conveyor belt structure layer may be provided on the core structure layer.

10 Claims, 10 Drawing Sheets

CONVEYOR STRUCTURE

CROSS-REFERENCE TO RELATED APPLICATION

This application claims the benefit of Provisional Application No. 62/543,660, filed on Aug. 10, 2017, in the United States Patent and Trademark Office, the disclosure of which is incorporated herein in its entirety by reference.

BACKGROUND OF THE INVENTION

1. Field of the Invention

The present invention relates to a conveyor structure in which a core is enclosed in a conveyor structure and the core includes rope and cloth.

2. Description of the Related Art

Figure 1:
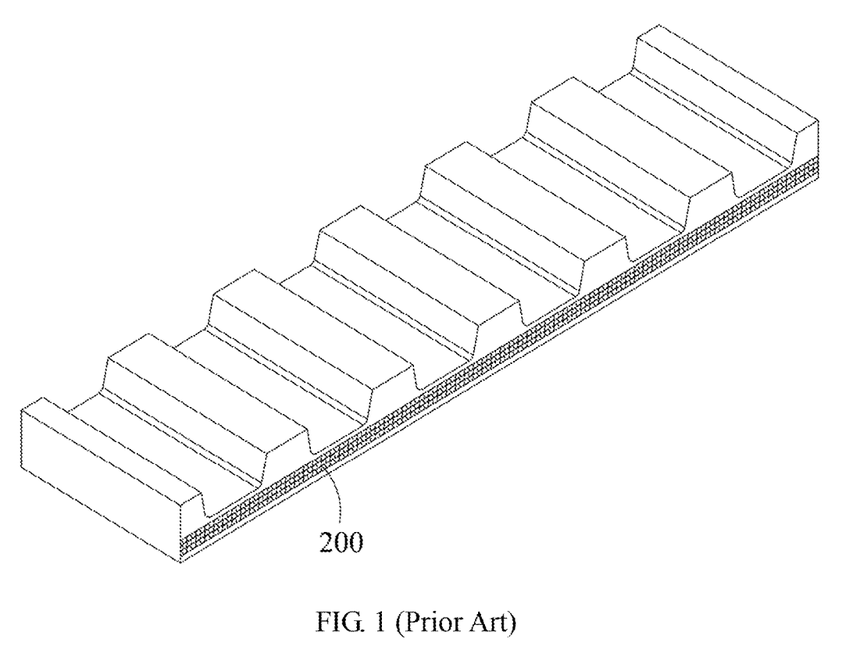
FIG. 1 is a schematic view of a conventional conveyor structure.
Figure 2:
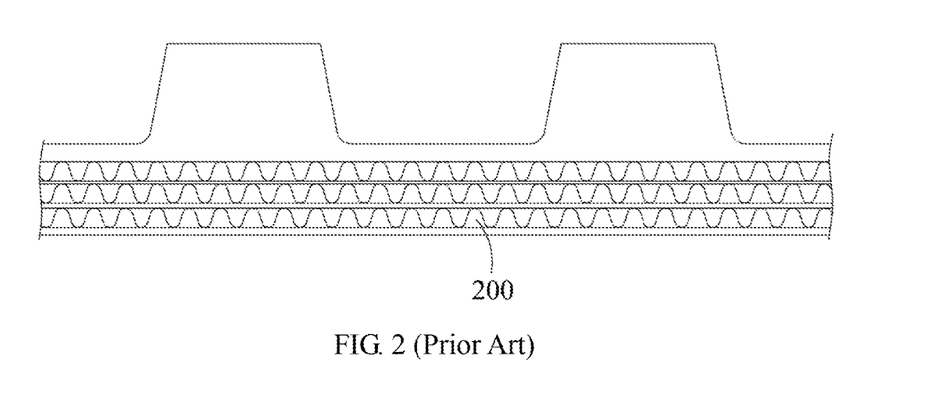
FIG. 2 is a side view of a conventional conveyor structure.

A conventional conveyor for an agricultural machine can use a composite belt formed by rubber and fiber cloth, instead of a chain, for power transmission. However, as shown in FIGS. 1 and 2, a core structure layer 200 disposed inside the widely used conventional conveyor structure may be exposed to the outside environment, and subsequently may be directly affected by water, vapor, or external objects easily.

Furthermore, the widely used conventional conveyor structure for an agricultural machine has a core structure layer 200 formed by a chemical fiber cloth only. In this case, the conventional conveyor structure has poor flexibility, and the joint part of the core structure layer 200 is more fragile. Therefore, what is needed is to develop a conveyor structure to solve the aforementioned problems.

SUMMARY OF THE INVENTION

The objective of the present invention is to provide a conveyor structure solving the problem that the conventional conveyor structure may be broken easily.

According to an embodiment, the present invention provides a conveyor structure adapted to an agricultural machine. The conveyor structure includes a first conveyor structure layer, a core structure layer, and a second conveyor structure layer. The core structure layer is disposed on the first conveyor structure layer, and includes a rope layer disposed on the first conveyor structure layer and having a plurality of warp ropes, a cloth layer disposed on the rope layer, a plurality of first wefts, and a plurality of second wefts. The plurality of first wefts and the plurality of second wefts are obliquely crossed with each other and are wrapped on the rope layer, or on the cloth layer, or on the rope layer and the cloth layer. The second conveyor structure layer is disposed on the core structure layer.

In an embodiment, the first conveyor structure layer and the second conveyor structure layer are applied by pressure during a sulfidation process. The plurality of first wefts and the plurality of second wefts are configured to constrain the plurality of warp ropes, the cloth layer, or the plurality of warp ropes and the cloth layer, so as to resist compression caused by the pressure of the sulfidation process.

In an embodiment, a width of the core structure layer is lower than that of each of the first conveyor structure layer and the second conveyor structure layer, and the core structure layer is fully sandwiched between the first conveyor structure layer and the second conveyor structure layer.

In an embodiment, the rope layer, the first wefts, the plurality of second wefts, and cloth layer include man-made fibers.

In an embodiment, the plurality of first conveyor structure layer and second conveyor structure layer include rubber.

In an embodiment, the conveyor structure further includes a plurality of convex structures formed on a top surface of each of the first conveyor structure layer and the second conveyor structure layer.

In an embodiment, the convex structures are formed on the top surfaces of the first conveyor structure layer and the second conveyor structure layer by a cutting manner.

In an embodiment, a portion of the cloth layer not penetrated by the plurality of fastening members is configured to provide a portion of a support force to the first conveyor structure layer and the second conveyor structure layer.

In an embodiment, portions of the rope layer and the plurality of first wefts and the plurality of second wefts not penetrated by the plurality of fastening members are configured to provide a portion of a support force to the first conveyor structure layer and the second conveyor structure layer.

In an embodiment, portions of the plurality of first wefts and the plurality of second wefts not penetrated by the plurality of fastening members are configured to provide a portion of a support force to the first conveyor structure layer and the second conveyor structure layer.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

The following embodiments of the present invention are herein described in detail with reference to the accompanying drawings. These drawings show specific examples of the embodiments of the present invention. It is to be understood that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be understood that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise/include" and variations such as "comprises/includes" or "comprising/including" will be understood to imply the inclusion of stated elements but not the exclusion of any other elements.

Please refer to FIGS. 3 to 8, which respectively are an appearance view, a schematic view, a sectional view, a schematic view of a first winding operation, and a schematic view of a second winding operation, a schematic view of a third winding operation of a conveyor structure according to an embodiment of the present invention. As shown in figures, a conveyor structure 10 includes a first conveyor structure layer 100, a core structure layer 200 and a second conveyor structure layer 300.

In this embodiment, the core structure layer 200 can be disposed on the first conveyor structure layer 100, and includes a rope layer 201, a plurality of first wefts 202, a plurality of second wefts 203 and a cloth layer 204. In an embodiment, the rope layer 201 and the cloth layer 204 include chemical fiber rope and chemical fiber cloth, respectively; and, the core structure layer 200 can combine the rope layer 201 and the cloth layer 204 to improve the durability of the core structure layer 200. For example, when one or either of the rope layer 201 and the cloth layer 204 is damaged, the other of the rope layer 201 and the cloth layer 204 can still maintain integrity of the conveyor structure 10 of the present invention. As a result, the core structure layer 200 of the present invention can provide a support force with a certain degree, unless the rope layer 201, the cloth layer 204, and the plurality of first wefts 202 and the plurality of second wefts 203, which are the reinforced assistant structure, are all damaged.

In practice, the rope layer 201 can be disposed on the first conveyor structure layer 100, and includes the plurality of warp ropes 2011. The plurality of second wefts 203 and the plurality of first wefts 202 can be obliquely intertwined with each other and wrapped on the rope layer 201, or on the cloth layer 204, or on the rope layer 201 and the cloth layer 204. The cloth layer 204 can be disposed on the rope layer 201. For example, the cloth layer 204 can be adhered on the rope layer 201. The second conveyor structure layer 300 can be disposed on the core structure layer 200. In an embodiment, the first conveyor structure layer 100 and the second conveyor structure layer 300 can include rubber.

Upon practical demand, the plurality of second wefts 203 and the plurality of first wefts 202 can be obliquely intertwined with each other and wrapped on the rope layer 201, or on the cloth layer 204. In an embodiment, the rope layer 201 can be adhered with the cloth layer 204 first, and the combined layer can be obliquely wrapped and crossed on the rope layer 201 and the cloth layer 204.

During the manufacturing process of the conveyor structure 10 of the present invention, in order to fix the shape of the rubber of the first conveyor structure layer 100 and the second conveyor structure layer 300, a sulfidation process must be performed. During the sulfidation process, the first conveyor structure layer 100 and the second conveyor structure layer 300 are applied by a pressure, and the plurality of first wefts 202 and the plurality of second wefts 203 can constrain the plurality of warp ropes 2011, or the cloth layer 204, or the plurality of warp ropes 2011 and the cloth layer 204, so as to resist compression caused by the pressure. For this reason, the plurality of first wefts 202 and the plurality of second wefts 203 are crossed each other in latitude direction during the sulfidation process. This ensures that the intensity of tear resistance in latitude direction can be enhanced and the plurality of warp ropes 2011 in longitude direction can be protected from being exposed because of compression during the sulfidation process.

Figure 3:
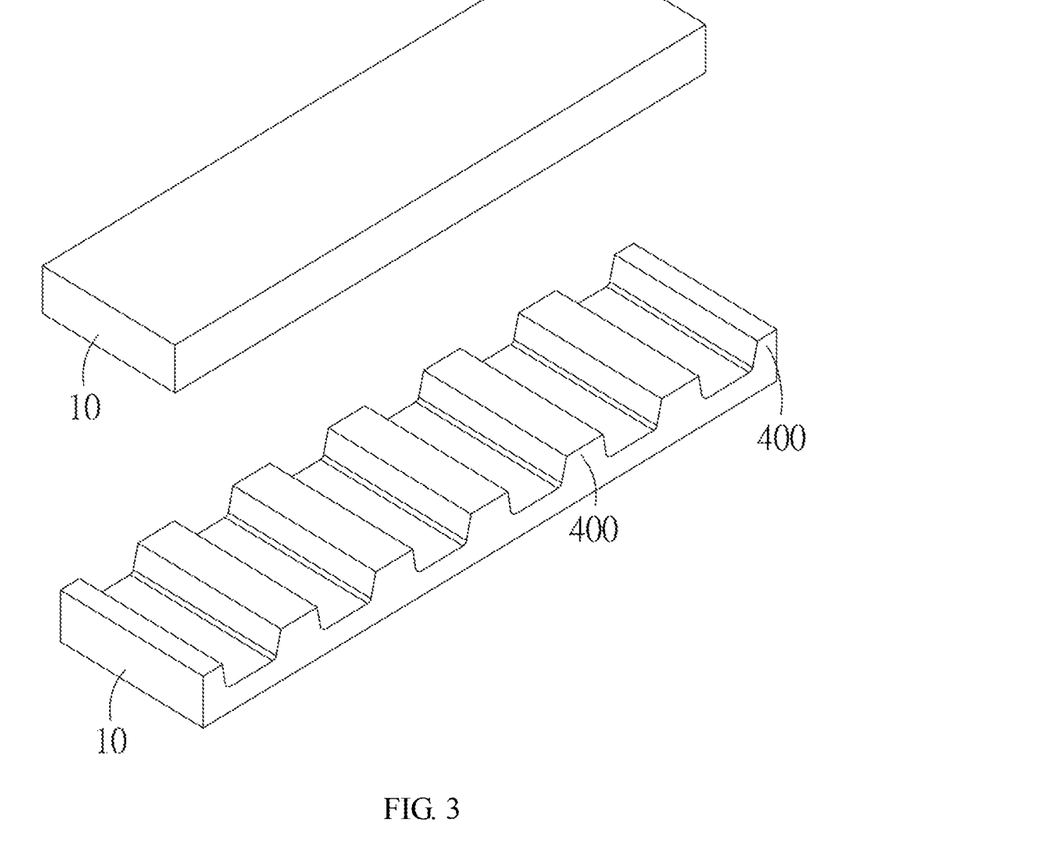
FIG. 3 is a schematic appearance view of a conveyor structure according to an embodiment of the present invention.
Figure 4:
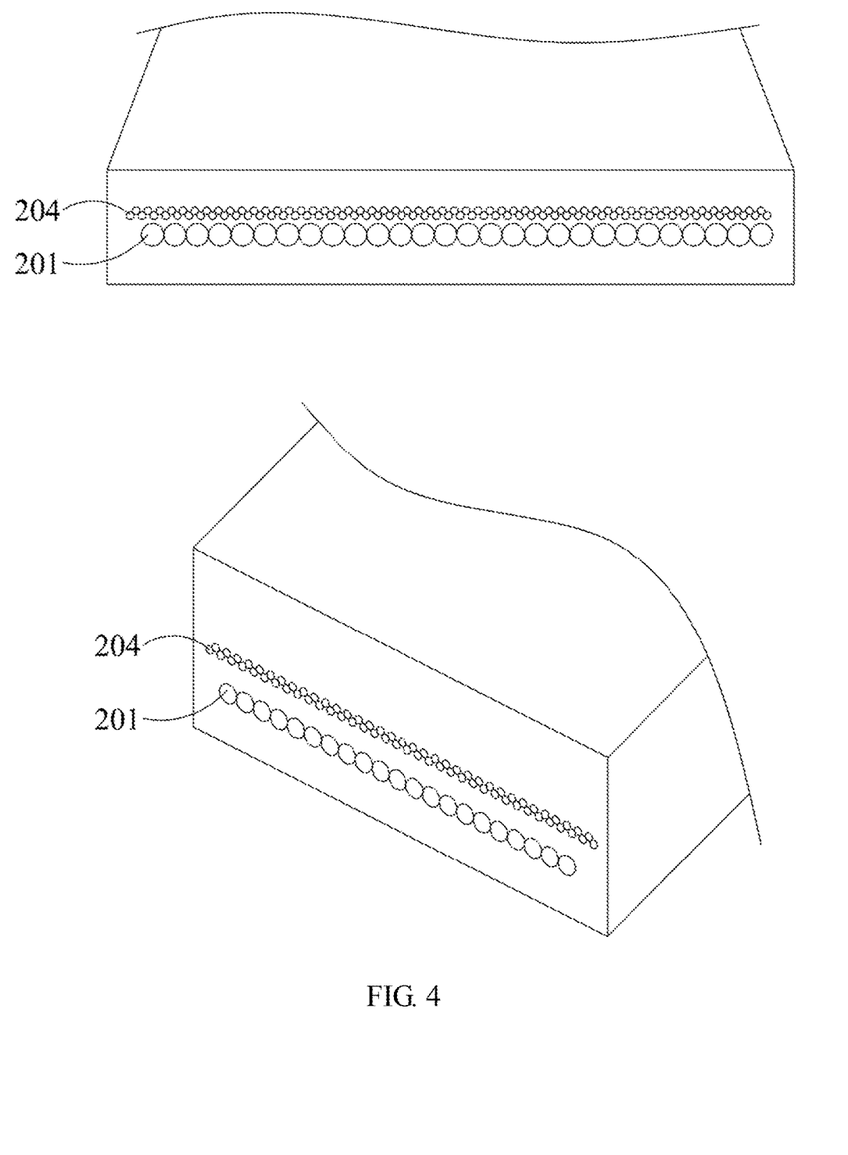
FIG. 4 is a schematic view of a conveyor structure according to an embodiment of the present invention.
Figure 5:
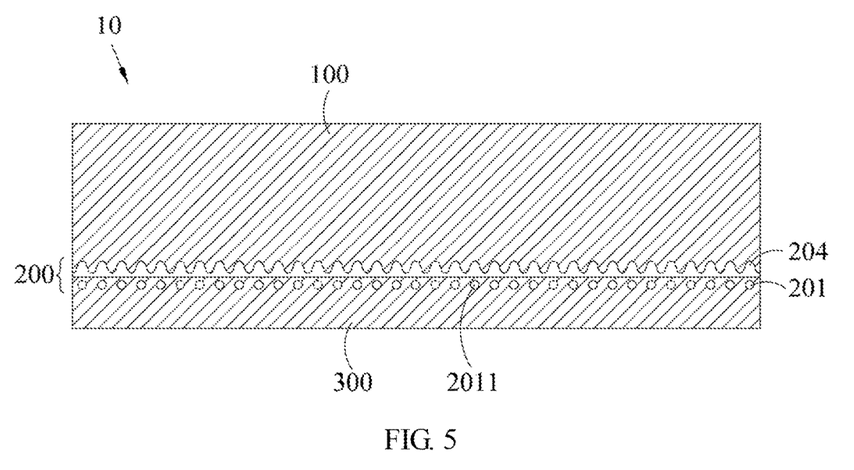
FIG. 5 is a sectional view of a conveyor structure according to an embodiment of the present invention.
Figure 6:
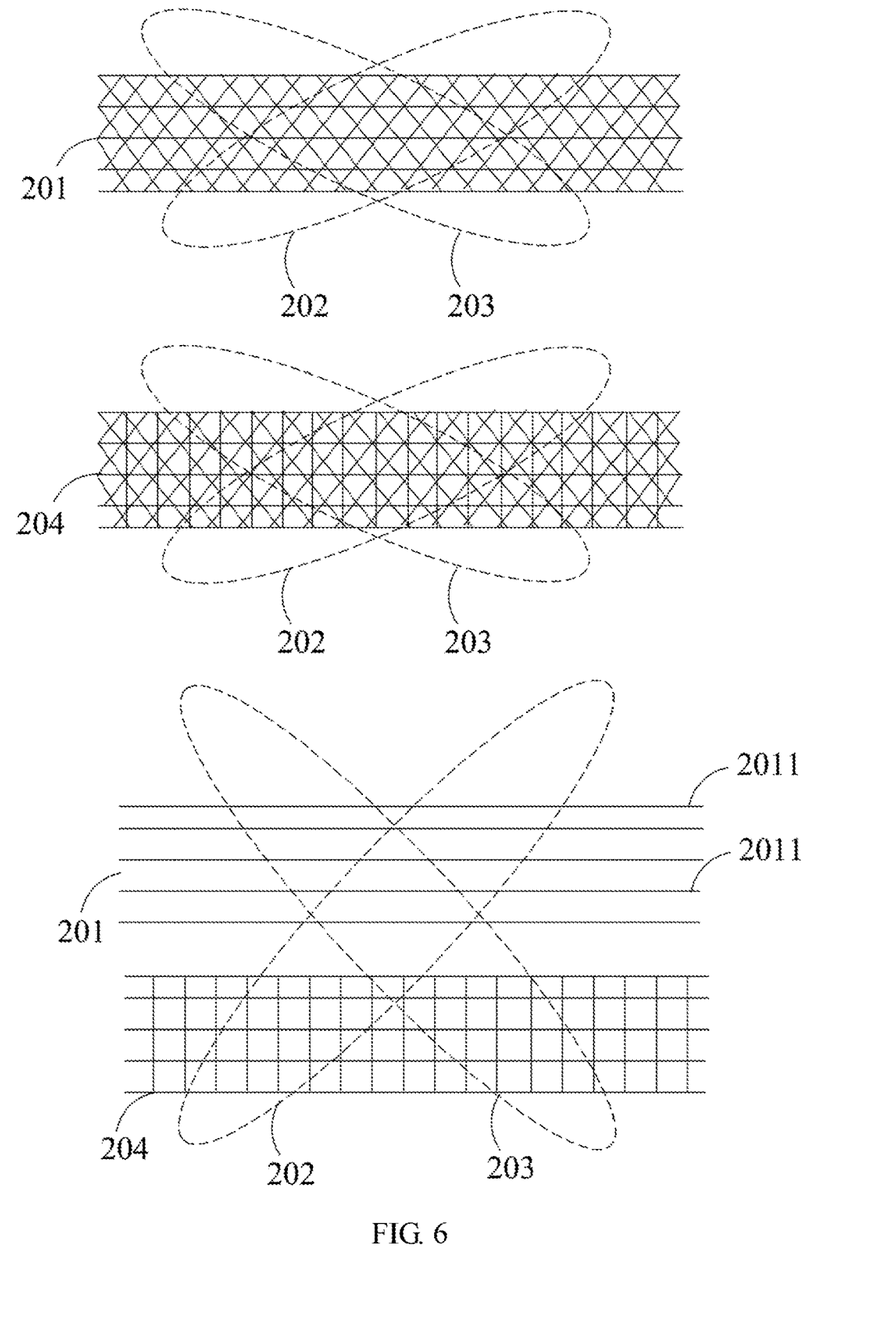
FIG. 6 is a schematic view of a first winding operation for a conveyor structure according to an embodiment of the present invention.
Figure 7:
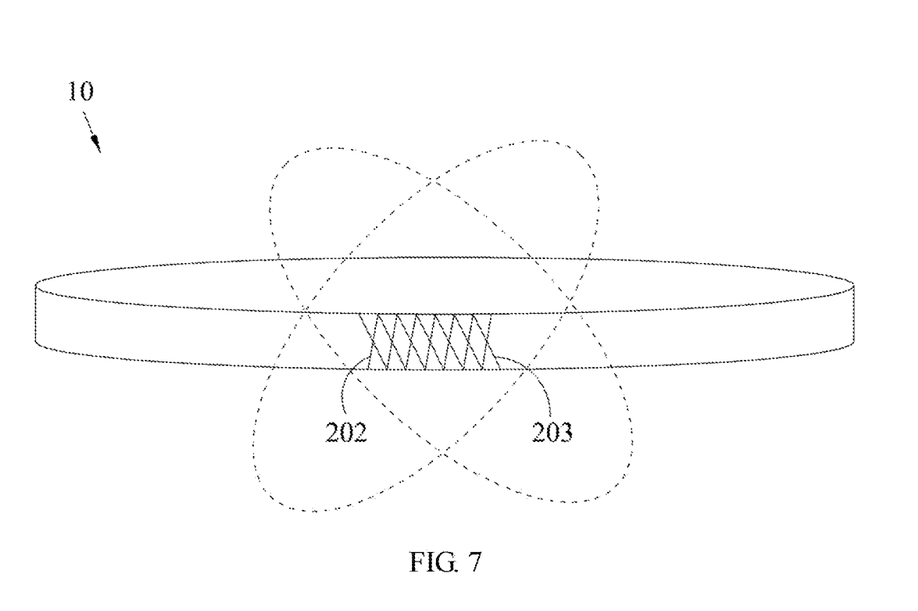
FIG. 7 is a schematic view of a second winding operation for a conveyor structure according to an embodiment of the present invention.
Figure 8:
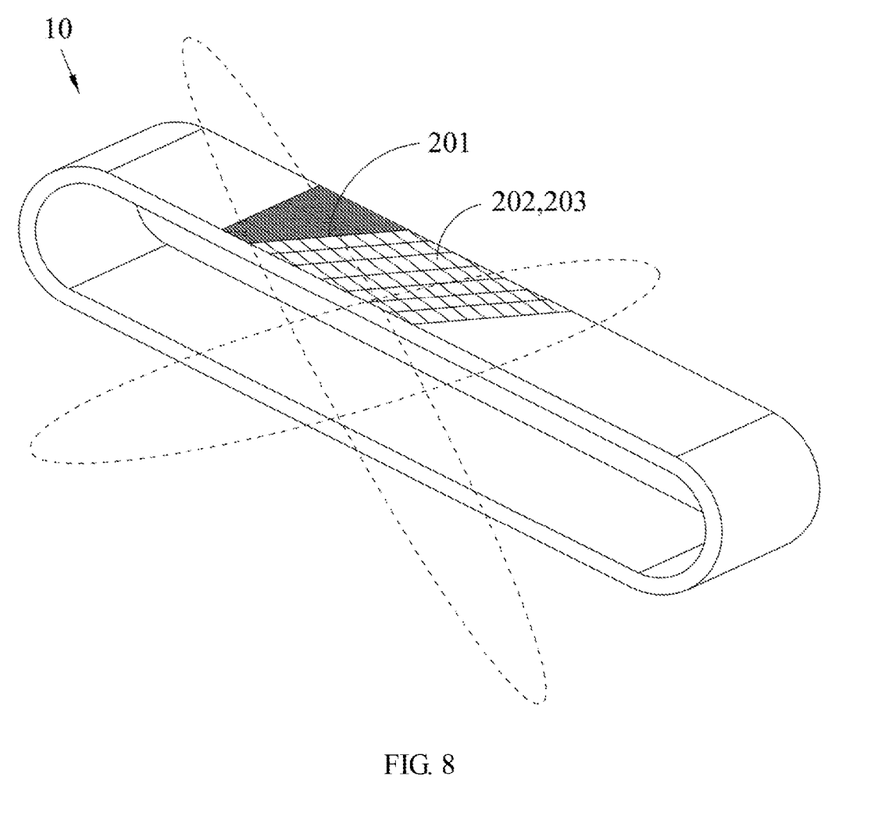
FIG. 8 is a schematic view of a second winding operation for a conveyor structure according to an embodiment of the present invention.

In an embodiment, a width of the core structure layer 200 can be lower than that of each of the first conveyor structure layer 100 and the second conveyor structure layer 300, as shown in FIG. 3, the core structure layer 200 can be fully sandwiched between the first conveyor structure layer 100 and the second conveyor structure layer 300. Since the core structure layer 200 is not exposed to outside environment, the core structure layer 200 is not easily affected by water, vapor or external objects directly.

In an embodiment, the rope layer 201, the plurality of first wefts 202, the plurality of second wefts 203 and the cloth layer 204 can include man-made fibers, and the first conveyor structure layer 100 and the second conveyor structure layer 300 can include rubber. The extensibility of each of the rope layer 201, the plurality of first wefts 202, the plurality of second wefts 203, and the cloth layer 204 is lower than that of each of the first conveyor structure layer 100 and second conveyor structure layer 300. In this way, the first conveyor structure layer 100 and the second conveyor structure layer 300 can be supported effectively.

Figure 9:
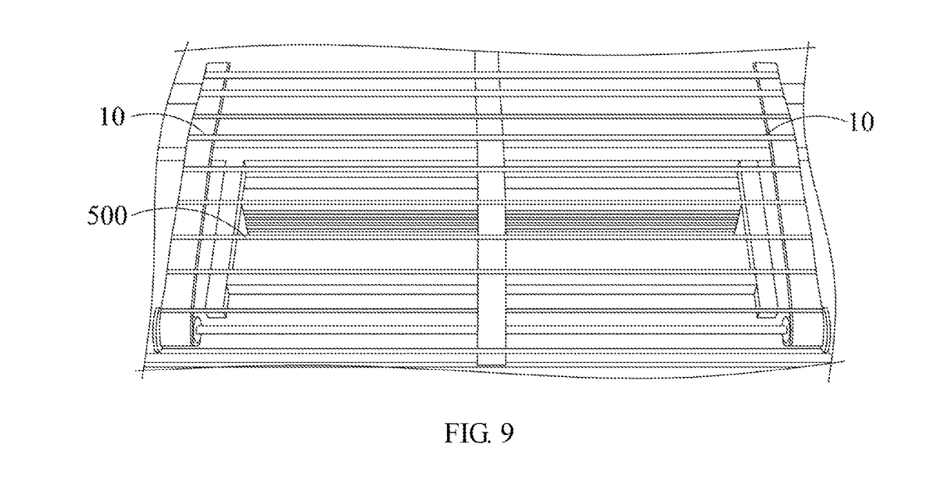
FIG. 9 is a schematic view of a conveyor structure according to a first embodiment of the present invention.
Figure 10:
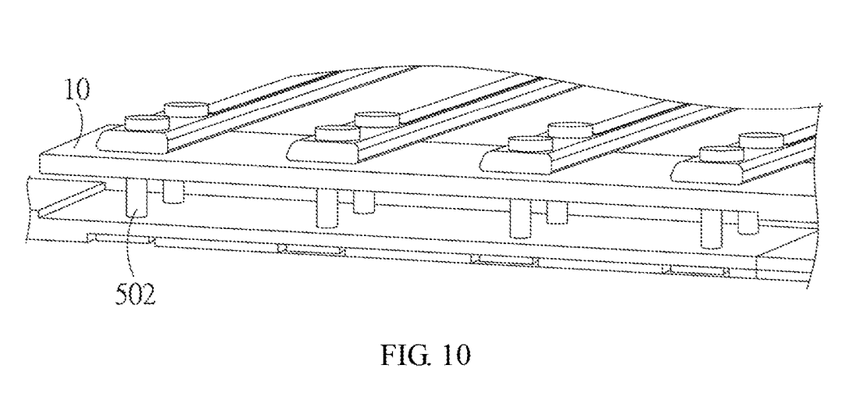
FIG. 10 is a schematic view of a conveyor structure according to a second embodiment of the present invention.

Please refer to FIGS. 9 and 10, which are a first schematic view and a second schematic view of a conveyor structure according to an embodiment of the present invention, respectively. In an embodiment, the conveyor structure 10 can include a plurality of convex structures 400 formed on a top surface of each of the first conveyor structure layer 100 and the second conveyor structure layer 300. The plurality of convex structures 400 are formed on the top surfaces of the first conveyor structure layer 100 and the second conveyor structure layer 300 by a cutting manner. The plurality of convex structures 400 in cooperation with gear or other power source can be used for power transmission.

In an embodiment, the conveyor structure 10 can be adapted to an agricultural machine 500, and the plurality of fastening members 501 of the agricultural machine 500 are disposed on the conveyor structure 10. Under the condition that the plurality of fastening member 501 penetrates the first conveyor structure layer 100, the core structure layer 200, and the second conveyor structure layer 300, the portions of the core structure layer 200 not penetrated by the fastening members 501 can provide a support force to the first conveyor structure layer 100 and the second conveyor structure layer 300.

In the core structure layer 200, a portion of the cloth layer 204, a portion of the warp rope 2011 of rope layer 201, portions of the second wefts 203, and portions of the first wefts 202, which are not penetrated by the fastening member 501, can provide a portion of the support force to the first conveyor structure layer 100 and the second conveyor structure layer 300, so as to maintain entire conveyor structure 10 to be stable.

Furthermore, the portion of the cloth layer 204 not penetrated by the fastening member 501 can provide a portion of the support force to the first conveyor structure layer 100 and the second conveyor structure layer 300, so that the conveyor structure 10 can be protected from being broken or damaged easily because of bending force, tension or other external force.

In addition, the portions of the rope layer 201, the first wefts 202 and the second wefts 203 not penetrated by the fastening members 501 can also provide the support force to the first conveyor structure layer 100, the second conveyor structure layer 300 and the cloth layer 204, so that the cloth layer 204, the rope layer 201, the plurality of first wefts 202, and the plurality of second wefts 203 can be used to effectively improve the intensity of entire conveyor structure 10.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A conveyor structure of an agricultural machine, the conveyor structure comprising:
    a first conveyor structure layer;
    a core structure layer disposed on the first conveyor structure layer, and comprising:
    a rope layer disposed on the first conveyor structure layer, and comprising a plurality of warp ropes;
    a cloth layer disposed on the rope layer;
    a plurality of first wefts; and
    a plurality of second wefts, wherein the plurality of first wefts and the plurality of second wefts are obliquely intertwined with each other and wrapped on the rope layer, or on the cloth layer, or on the rope layer and the cloth layer; and
    a second conveyor structure layer disposed on the core structure layer;
    a plurality of fastening members disposed on the conveyor structure and penetrating the first conveyor structure layer and the second conveyor structure layer, wherein portions of the core structure layer not penetrated by the plurality of fastening members providing a support force to the first conveyor structure layer and the second conveyor structure layer.

2. The conveyor structure according to claim 1, wherein the first conveyor structure layer and the second conveyor structure layer are applied by pressure during a sulfidation process, the plurality of first wefts and the plurality of second wefts are configured to constrain the plurality of warp ropes, the cloth layer, or the plurality of warp ropes and the cloth layer, so as to resist compression caused by the pressure from the sulfidation process.

3. The conveyor structure according to claim 1, wherein a width of the core structure layer is lower than that of each of the first conveyor structure layer and the second conveyor structure layer, and the core structure layer is fully sandwiched between the first conveyor structure layer and the second conveyor structure layer.

4. The conveyor structure according to claim 1, wherein the rope layer, the first wefts, the plurality of second wefts, and cloth layer comprise man-made fibers.

5. The conveyor structure according to claim 1, wherein the first conveyor structure layer and second conveyor structure layer comprise rubber.

6. The conveyor structure according to claim 1, further comprising a plurality of convex structures formed on a top surface of each of the first conveyor structure layer and the second conveyor structure layer.

7. The conveyor structure according to claim 6, wherein the plurality of convex structures are formed on the top surfaces of the first conveyor structure layer and the second conveyor structure layer by a cutting manner.

8. The conveyor structure according to claim 1, wherein a portion of the cloth layer not penetrated by the plurality of fastening members is configured to provide a portion of the support force to the first conveyor structure layer and the second conveyor structure layer.

9. The conveyor structure according to claim 1, wherein portions of the rope layer, the plurality of first wefts and the plurality of second wefts not penetrated by the plurality of fastening members are configured to provide a portion of the support force to the first conveyor structure layer and the second conveyor structure layer.

10. The conveyor structure according to claim 1, wherein portions of the plurality of first wefts and the plurality of second wefts not penetrated by the plurality of fastening members are configured to provide a portion of the support force to the first conveyor structure layer and the second conveyor structure layer.

* * * * *